United States Patent
Park et al.

(10) Patent No.: US 12,122,358 B2
(45) Date of Patent: Oct. 22, 2024

(54) HYBRID ELECTRIC VEHICLE AND METHOD OF CONTROLLING THE SAME

(71) Applicants: Hyundai Motor Company, Seoul (KR); Kia Corporation, Seoul (KR)

(72) Inventors: Seong Ik Park, Seoul (KR); Sung Chan Na, Seoul (KR); Ku Young Kang, Seoul (KR); Yong Hoon Lee, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 441 days.

(21) Appl. No.: 17/499,552

(22) Filed: Oct. 12, 2021

(65) Prior Publication Data

US 2022/0111833 A1   Apr. 14, 2022

(30) Foreign Application Priority Data

Oct. 12, 2020   (KR) .................. 10-2020-0131107

(51) Int. Cl.
*B60W 20/50* (2016.01)
*B60K 6/445* (2007.10)
(Continued)

(52) U.S. Cl.
CPC ............ *B60W 20/50* (2013.01); *B60K 6/445* (2013.01); *B60W 10/06* (2013.01); *B60W 10/08* (2013.01);
(Continued)

(58) Field of Classification Search
CPC ...... B60W 10/06; B60W 10/08; B60W 10/11; B60W 20/19; B60W 20/30; B60W 20/40;
(Continued)

(56) References Cited

U.S. PATENT DOCUMENTS

| 7,591,339 B2 * | 9/2009 | Sugimoto | B60W 30/02 180/242 |
| 2008/0309468 A1 * | 12/2008 | Greene | G08G 1/166 340/436 |

(Continued)

FOREIGN PATENT DOCUMENTS

| CN | 110395243 A | * 11/2019 | ............... B60K 6/22 |
| EP | 2594445 A2 | * 5/2013 | ............... B60K 6/48 |

(Continued)

OTHER PUBLICATIONS

Machine translation of JP-2013043503-A downloaded Jan. 3, 2024 (Year: 2024).*

(Continued)

*Primary Examiner* — Peter D Nolan
*Assistant Examiner* — Tanya C Sienko
(74) *Attorney, Agent, or Firm* — Slater Matsil, LLP

(57) ABSTRACT

A method of controlling a hybrid electric vehicle including an engine and a first motor connected to main drive wheels and a second motor connected to auxiliary drive wheels includes determining a required torque, in response to a predetermined condition being satisfied, determining a first torque that the second motor is to continuously output based on the required torque and a vehicle speed and determining a second torque that the second motor is to discontinuously output in order to compensate for acceleration loss in a situation in which the acceleration loss occurs based on a state of an engine clutch disposed between the engine and the first motor, a state of a transmission, or the required torque, and determining a final torque of the second motor based on the first and second torques.

20 Claims, 7 Drawing Sheets

(51) Int. Cl.
  *B60W 10/06* (2006.01)
  *B60W 10/08* (2006.01)
  *B60W 10/11* (2012.01)
  *B60W 20/19* (2016.01)
  *B60W 20/30* (2016.01)
  *B60W 20/40* (2016.01)

(52) U.S. Cl.
  CPC ............ *B60W 10/11* (2013.01); *B60W 20/19* (2016.01); *B60W 20/30* (2013.01); *B60W 20/40* (2013.01); B60W 2300/18 (2013.01); B60W 2510/0208 (2013.01); B60W 2510/081 (2013.01); B60W 2510/087 (2013.01); B60W 2510/244 (2013.01); B60W 2520/10 (2013.01); B60W 2710/082 (2013.01); B60W 2710/083 (2013.01); B60W 2720/40 (2013.01)

(58) Field of Classification Search
  CPC ..... B60W 2300/18; B60W 2510/0208; B60W 2510/081; B60W 2510/087; B60W 2510/244; B60W 2520/10; B60W 2710/082; B60W 2710/083; B60W 2720/40
  See application file for complete search history.

(56) References Cited

U.S. PATENT DOCUMENTS

| | | | | |
|---|---|---|---|---|
| 2008/0312830 A1* | 12/2008 | Liu | ................ | G08G 1/166 340/436 |
| 2008/0312831 A1* | 12/2008 | Greene | ................ | G08G 1/166 701/301 |
| 2008/0312832 A1* | 12/2008 | Greene | ................ | G08G 1/166 701/301 |
| 2011/0295451 A1* | 12/2011 | Fassnacht | ............ | B60W 10/10 701/1 |
| 2012/0078455 A1* | 3/2012 | Chrostowski | ....... | B60W 30/188 903/930 |
| 2013/0079966 A1* | 3/2013 | Terakawa | .............. | B60W 10/02 180/65.265 |
| 2014/0228167 A1* | 8/2014 | Frank | .................... | B60K 6/442 180/65.265 |
| 2016/0159341 A1* | 6/2016 | Tabata | ................. | B60W 10/06 180/65.23 |
| 2019/0009781 A1* | 1/2019 | Segawa | ................ | B60W 20/10 |
| 2019/0315336 A1* | 10/2019 | Merienne | ............ | B60L 15/2045 |
| 2020/0346635 A1* | 11/2020 | Wei | ...................... | B60W 30/19 |
| 2022/0119006 A1* | 4/2022 | Ariyaratne | ......... | G01C 21/3804 |

FOREIGN PATENT DOCUMENTS

| | | | | |
|---|---|---|---|---|
| JP | 2013043503 A | * | 3/2013 | |
| WO | WO-2016038822 A1 | * | 3/2016 | ............ B60K 6/442 |

OTHER PUBLICATIONS

Machine translation of CN110395243A downloaded Feb. 12, 2024 (Year: 2024).*

* cited by examiner

HYBRID ELECTRIC VEHICLE AND METHOD OF CONTROLLING THE SAME

CROSS-REFERENCE TO RELATED APPLICATIONS

This application claims the benefit of Korean Patent Application No. 10-2020-01131107, filed on Oct. 12, 2020, which application is hereby incorporated herein by reference.

TECHNICAL FIELD

The present invention relates to an all-wheel-drive hybrid electric vehicle and to a method of controlling the same.

BACKGROUND

A general vehicle employs a two-wheel-drive system, in which power of a power source is transmitted to two drive wheels, i.e. two front wheels or two rear wheels, depending on the type of powertrain system. Different therefrom, an all-wheel-drive (AWD) vehicle is a vehicle in which power of a power source is transmitted to all of the four wheels, either constantly or when necessary.

An all-wheel-drive vehicle is advantageous in that power is more stably transmitted to the ground than in the case of a two-wheel-drive vehicle when the road condition is bad or when the vehicle turns a corner.

FIG. 1 shows an example of the structure of an all-wheel-drive vehicle.

Referring to FIG. 1, an internal combustion engine, in brief, an engine no, is started through cranking by a starter motor (or a starter) 120. The power of the engine no is transmitted to a transfer case 190 via a transmission 150. The transfer case 190 divides and transfers the power to front wheels and rear wheels according to a power split ratio set for respective situations.

The system of distributing power to front wheels and rear wheels through the transfer case 190 may be referred to as a "mechanical all-wheel-drive system". However, the mechanical all-wheel-drive system has a shortcoming in that mechanical loss occurs when power passes through the transfer case 190.

Unlike this, an electric all-wheel-drive (e-AWD) system, in which a motor is connected to auxiliary drive wheels as a power source, does not require the transfer case 190, and thus is advantageous in that efficiency is higher and power distribution is more freely realized than in the case of a mechanical all-wheel-drive system.

FIG. 2 shows an example of the structure of a hybrid electric vehicle employing an electric all-wheel-drive system.

In general, a hybrid electric vehicle (HEV) is a vehicle that uses two types of power sources, the two types of power sources being an engine and a motor. Compared with a vehicle equipped only with an internal combustion engine, the hybrid electric vehicle exhibits excellent fuel efficiency, improved power performance, and reduced emissions. Thus, hybrid electric vehicles have recently been actively developed.

Referring to FIG. 2, in general, in a vehicle equipped with an electric all-wheel-drive system, front wheels 181 serve as main drive wheels, and rear wheels 182 serve as auxiliary drive wheels. Such a vehicle is driven using power of a hybrid powertrain connected to the front wheels 181 at normal times. Also, the vehicle can be driven in an all-wheel-drive mode by operating a motor 170 connected to the rear wheels 182 depending on the situation. The power of the motor 170 connected to the rear wheels 182 is transmitted to the rear wheels 182 via a final drive (FD) 162.

The hybrid powertrain of the main drive wheels shown in FIG. 2 is implemented as a parallel-type or transmission-mounted-electric-drive (TMED)-type hybrid system. This hybrid powertrain may operate in one of two driving modes depending on the power source that is being driven. One of the two driving modes is an electric vehicle (EV) mode, in which the hybrid electric vehicle travels using only a motor 140, and the other one thereof is a hybrid electric vehicle (HEV) mode, in which power is generated by driving both the motor 140 and the engine 110. While traveling, the hybrid electric vehicle switches between the two driving modes depending on the traveling conditions. In general, switching between the two driving modes is performed in order to maximize fuel efficiency or driving performance based on the efficiency characteristics of the powertrain.

Specifically, in the hybrid powertrain of the main drive wheels, the motor (or drive motor) 140 and the engine clutch (EC) 130 are disposed between the internal combustion engine (ICE) 110 and the transmission 150.

In such a vehicle, when a driver steps on an accelerator pedal after starting the vehicle, the motor 140 is first driven using the power of a battery in the state in which the engine clutch 130 is open, and then the power of the motor 140 is transmitted to the wheels via the transmission 150 and the final drive (FD) 161 in order to rotate the wheels (i.e. the EV mode). When greater power is needed as the vehicle is gradually accelerated, a starter/generator motor 120 operates to drive the engine 110.

When the rotational speeds of the engine no and the motor 140 become equal, the engine clutch 130 becomes locked, with the result that both the engine 110 and the motor 140, or only the engine 110, drives the vehicle (i.e. transitioning from the EV mode to the HEV mode). When a predetermined engine OFF condition is satisfied, for example, when the vehicle decelerates, the engine clutch 130 becomes open, and the engine 110 is stopped (i.e. transitioning from the HEV mode to the EV mode). In addition, when the hybrid electric vehicle brakes, the power of the wheels is converted into electrical energy, and the battery is charged with the electrical energy, which is referred to as recovery of braking energy or regenerative braking.

The starter/generator motor 120 serves as a starter motor when the engine is started, and operates as a generator when the rotational energy of the engine is collected after the engine is started or when the engine is turned off. Therefore, the starter/generator motor 120 may be referred to as a "hybrid starter generator (HSG)", or may also be referred to as an "auxiliary motor" in some cases.

In the conventional electric all-wheel-drive hybrid electric vehicle, the motor 170 connected to the auxiliary drive wheels needs to be controlled within a normal temperature range at all times in order to respond to all-wheel-drive control, the time of occurrence of which is not predictable, and thus it is difficult to assist the powertrain of the main drive wheels. In the state in which the auxiliary drive wheels do not assist the travel of the vehicle, when torque exceeding the available torque of the motor 140 is required during the EV mode, a delay occurs until the power of the engine 110 is transmitted to the wheels in the course of transition to the HEV mode, thus incurring a problem of occurrence of an unpleasant secondary launch effect.

Further, in order to respond to acceleration loss (G-Loss) during an inertia phase in which the speed of the input terminal of the transmission 150 is decreased at the time of upshifting, the torque of the power source may be increased during a torque phase prior to the inertia phase. However, when high torque is required in the state in which the auxiliary drive wheels do not assist the travel of the vehicle, the capability to additionally increase the torque during the inertia phase is insufficient because the power source is already outputting high torque, thus incurring a problem of occurrence of acceleration loss.

SUMMARY

The present invention relates to an all-wheel-drive hybrid electric vehicle and to a method of controlling the same. Particular embodiments relate to an all-wheel-drive hybrid electric vehicle exhibiting improved launch and acceleration performance using a motor connected to auxiliary drive wheels and to a method of controlling the same.

Accordingly, embodiments of the present invention provide a hybrid electric vehicle and a method of controlling the same that may substantially obviate one or more problems due to limitations and disadvantages of the related art.

An embodiment of the present invention provides an all-wheel-drive hybrid electric vehicle and a method of controlling the same capable of improving launch and acceleration performance using a motor connected to auxiliary drive wheels while reducing the influence on all-wheel-drive control.

In particular, an embodiment of the present invention provides an all-wheel-drive hybrid electric vehicle and a method of controlling the same capable of compensating for acceleration loss in an upshift situation as well as in a situation of assisting the power of main drive wheels.

However, the embodiments of the present invention are not limited to the above-mentioned embodiments, and other embodiments not mentioned herein will be clearly understood by those skilled in the art from the following description.

An embodiment of the present invention provides a method of controlling a hybrid electric vehicle in which an engine and a first motor are connected to main drive wheels and a second motor is connected to auxiliary drive wheels may include determining a required torque, determining a first torque that the second motor is to continuously output based on the determined required torque and the vehicle speed when a predetermined condition is satisfied, determining a second torque that the second motor is to discontinuously output in order to compensate for acceleration loss in the situation in which the acceleration loss occurs based on at least one of the state of an engine clutch disposed between the engine and the first motor, the state of a transmission, or the required torque when the predetermined condition is satisfied, and determining the final torque of the second motor based on the first torque and the second torque.

In addition, a hybrid electric vehicle according to an embodiment of the present invention may include an engine connected to main drive wheels, a first motor connected to the main drive wheels, a second motor connected to auxiliary drive wheels, a first controller configured, when a predetermined condition is satisfied, to determine a first torque that the second motor is to continuously output based on a required torque and the vehicle speed, to determine a second torque that the second motor is to discontinuously output in order to compensate for acceleration loss in the situation in which the acceleration loss occurs based on at least one of the state of an engine clutch disposed between the engine and the first motor, the state of a transmission, or the required torque, and to determine the final torque of the second motor based on the first torque and the second torque, and a second controller configured to control the second motor to output the final torque.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF ILLUSTRATIVE EMBODIMENTS

Figure 1:
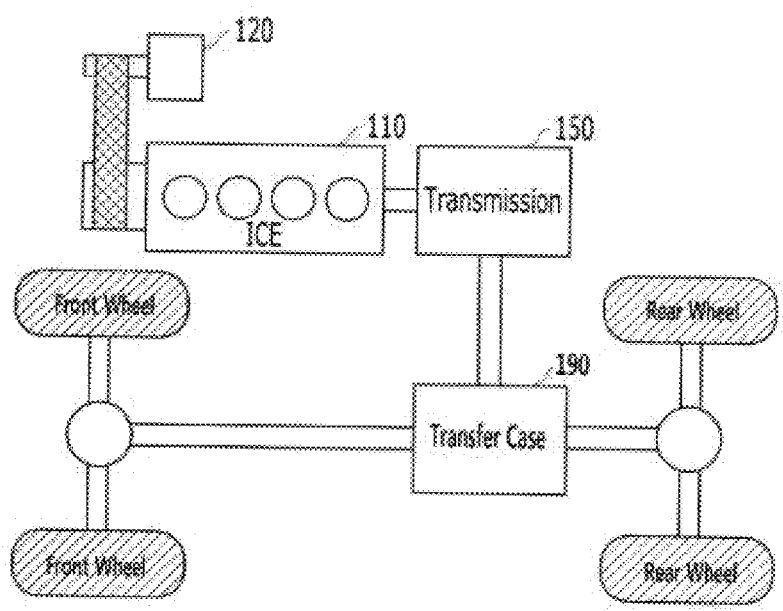
FIG. 1 shows an example of the structure of an all-wheel-drive vehicle.

Hereinafter, embodiments of the present invention will be described in detail with reference to the accompanying drawings so that those skilled in the art may easily carry out the embodiments. The present invention may, however, be embodied in many different forms, and should not be construed as being limited to the embodiments set forth herein. In the drawings, parts irrelevant to the description of embodiments of the present invention will be omitted for clarity. Like reference numerals refer to like elements throughout the specification.

Throughout the specification, when a certain part "includes" or "comprises" a certain component, this indicates that other components are not excluded, and may be further included unless otherwise noted. The same reference numerals used throughout the specification refer to the same constituent elements.

It is assumed that an electric all-wheel-drive hybrid electric vehicle to which embodiments of the present invention are applied has the powertrain configured as described above with reference to FIG. 2. In the following description, the electric all-wheel-drive hybrid electric vehicle will be referred to as a "hybrid electric vehicle" for convenience of description unless otherwise stated. The motor 140 disposed on the input terminal side of the transmission 150 of the main drive wheels will be referred to as a "first motor", and the motor 170 disposed at the auxiliary drive wheels will be referred to as a "second motor".

The control system of the hybrid electric vehicle will be described below with reference to FIG. 3.

Figure 3:
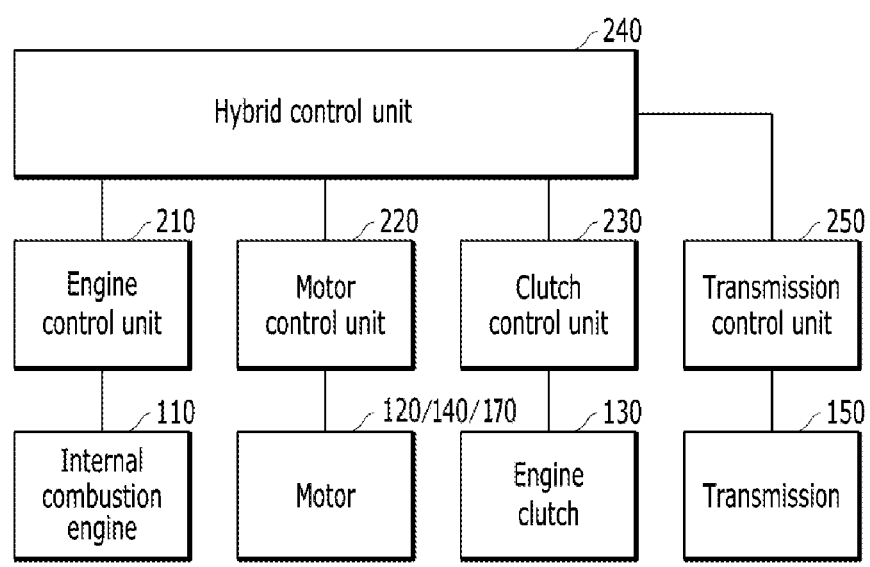
FIG. 3 is a block diagram showing an example of a control system of a hybrid electric vehicle to which embodiments of the present invention are applicable.

FIG. 3 is a block diagram showing an example of the control system of the hybrid electric vehicle to which embodiments of the present invention are applicable.

Referring to FIG. 3, in the hybrid electric vehicle to which embodiments of the present invention are applicable, the internal combustion engine no may be controlled by an engine control unit 210. The starter/generator motor 120, the first drive motor 140, and the second drive motor 170 may be controlled by a motor control unit (MCU) 220. The engine clutch 130 may be controlled by a clutch control unit 230. Here, the engine control unit 210 is also referred to as an engine management system (EMS). In addition, the transmission 150 is controlled by a transmission control unit 250. In some cases, the motor control unit for controlling the starter/generator motor 120 and the motor control unit for controlling each of the first and second drive motors 140 and 170 may be provided separately from each other. In addition, when the engine clutch 130 is a normally-closed-type dry engine clutch, the clutch control unit 230 may include a hydrostatic clutch actuator (HCA).

Each of the control units may be connected to a hybrid control unit (HCU) 240, which is an upper-level control unit that controls the overall process of mode switching, and may provide information necessary for engine clutch control at the time of switching a driving mode or shifting gears and/or information necessary for engine stop control to the hybrid control unit 240, or may perform an operation in response to a control signal under the control of the hybrid control unit 240.

More specifically, the hybrid control unit 240 determines whether to perform mode switching depending on the traveling state of the vehicle. For example, the hybrid control unit may determine the state of the engine clutch 130 (lock-up, slip, open, etc.), may determine the time at which to disengage the engine clutch, and may control the time at which to stop injecting fuel into the engine 110. In addition, the hybrid control unit may transmit a torque command for controlling the torque of the starter/generator motor 120 to the motor control unit 220 in order to control stopping of the engine, thereby controlling recovery of the rotational energy of the engine. In addition, the hybrid control unit 240 may control the lower-level control units so as to determine the mode-switching condition and perform mode switching at the time of performing driving-mode-switching control.

Of course, it will be apparent to those skilled in the art that the connection relationships between the control units and the functions/division of the control units described above are merely illustrative, and are not limited by the names thereof. For example, the hybrid control unit 240 may be implemented such that the function thereof is provided by any one of the control units other than the hybrid control unit 240 or such that the function thereof is distributed and provided by two or more of the other control units.

Figure 2:
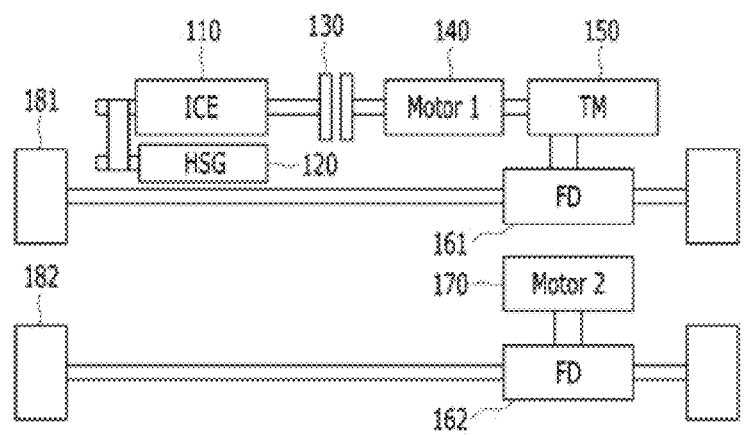
FIG. 2 shows an example of the structure of a hybrid electric vehicle employing an electric all-wheel-drive system.

The following description of the embodiments will be made on the assumption that the embodiments are applied to a hybrid electric vehicle having the powertrain configuration shown in FIG. 2 and the control units shown in FIG. 3. However, this is for convenience of description, and it will be apparent to those skilled in the art that the structure of the vehicle according to the embodiment may be changed within a range that remains compatible with the embodiment.

Hereinafter, a method of controlling a powertrain according to embodiments of the present invention will be described based on the above-described configuration of the hybrid electric vehicle.

Figure 4:
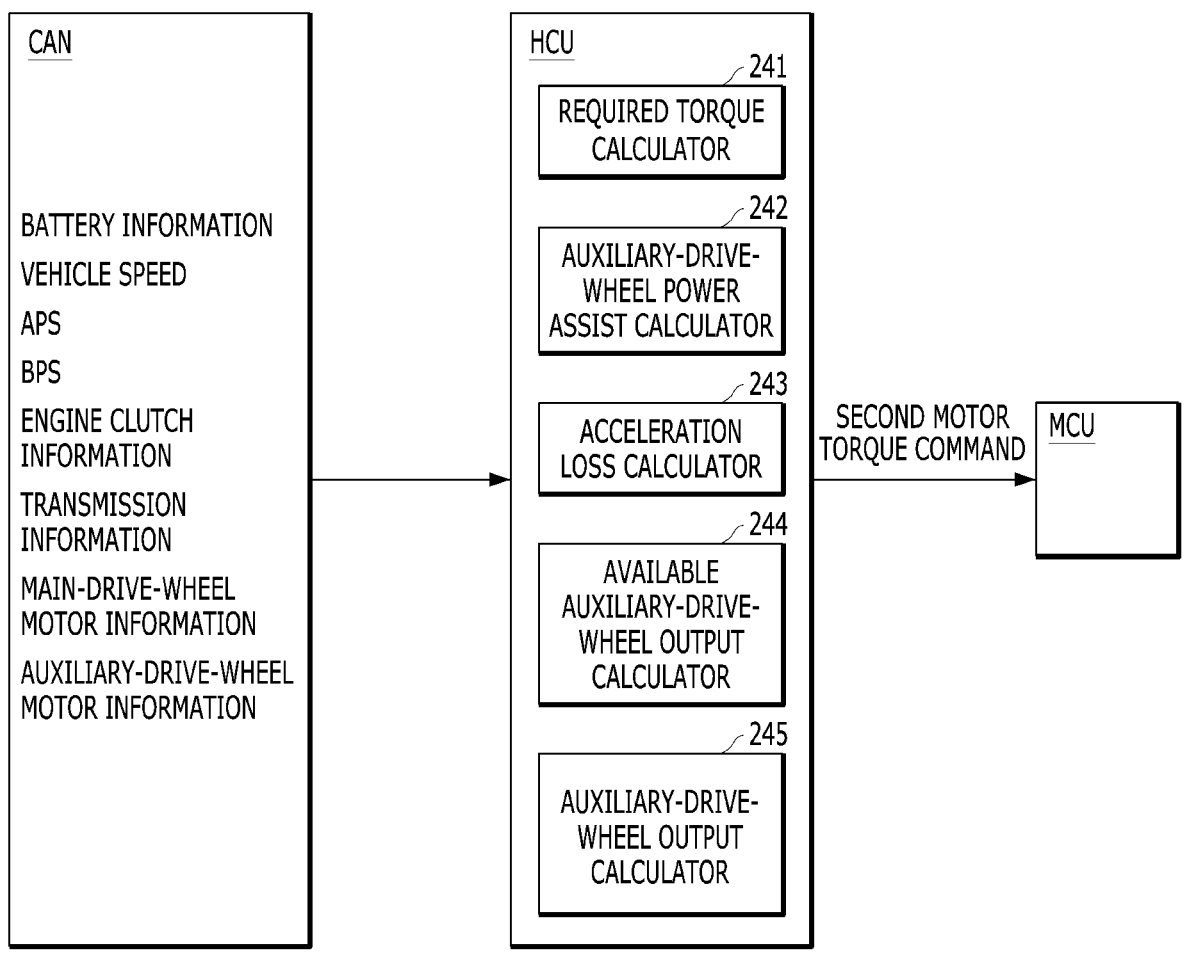
FIG. 4 shows an example of the configuration of a hybrid control unit according to an embodiment of the present invention.

FIG. 4 shows an example of the configuration of the hybrid control unit according to an embodiment of the present invention.

Referring to FIG. 4, the hybrid control unit 240 may acquire information necessary for control from various control units and sensors connected through a predetermined vehicle network, for example, a controller area network (CAN) communication system, and may output a torque command corresponding to the torque that is to be output by the second motor 170 to the motor control unit 220.

More specifically, the input information may include at least one of battery information, vehicle speed information, pedal manipulation information, engine clutch information, transmission information, main-drive-wheel motor information, or auxiliary-drive-wheel motor information.

Here, the battery information may include the state of charge (SOC) of the battery and the discharging limitation amount (for example, available SOC) of the battery. The battery information may be acquired from the battery management system (BMS), without being necessarily limited thereto. For example, the discharging limitation amount information may be determined by the hybrid control unit 240 based on the current SOC.

The vehicle speed information may be acquired from a vehicle speed sensor or a wheel speed sensor, and the pedal manipulation information may include a value of an accelerator position sensor (APS) and a value of a brake position sensor (BPS).

The engine clutch information may include the state of the engine clutch 130 (i.e. engagement/disengagement/slip) and a transmission torque value of the engine clutch 130. The engine clutch information may be acquired from the clutch control unit 230.

The transmission information may include at least one of a shift class (upshift, downshift, kick-down shift, etc.), a shift phase (torque phase, inertia phase, etc.), a shift progress state, a current shift stage, or a target shift stage. The transmission information may be acquired from the transmission control unit 250.

The main-drive-wheel motor information may include information about power consumed by the first motor 140. The auxiliary-drive-wheel motor information may include information about the temperature of the second motor 170. The main-drive-wheel motor information and the auxiliary-drive-wheel motor information may be acquired from the motor control unit 220.

Hereinafter, components of the hybrid control unit 240 will be described.

The hybrid control unit 240 may include a required torque calculator 241, an auxiliary-drive-wheel power assist calculator 242, an acceleration loss calculator 243, an available auxiliary-drive-wheel output calculator 244, and an auxiliary-drive-wheel torque calculator 245.

First, the required torque calculator 241 may determine a driver's required torque based on the APS value, the BPS value, the vehicle speed, and the SOC of the battery.

The auxiliary-drive-wheel power assist calculator 242 may calculate the power assist amount that the second motor 170 will be responsible for, among the required torque, based on the driver's required torque, the APS value, and the vehicle speed determined by the required torque calculator 241. Here, since the power assist amount is continuously output, it may be referred to as "continuous torque".

The acceleration loss calculator 243 may calculate acceleration loss that may occur during transition from the EV mode to the HEV mode based on at least one of the required torque, the state of the engine clutch, or the discharging limitation amount of the battery. The output of the first motor 140 is restricted according to the discharging limitation amount of the battery. Based thereon, it is possible to determine acceleration loss, i.e. the amount by which the transmission torque is less than the required torque, until the output of the engine is transmitted to the wheels. Also, it is possible to know the time point at which the power of the engine 110 is to be transmitted to the input terminal of the transmission based on the state of the engine clutch.

In addition, the acceleration loss calculator 243 may calculate acceleration loss due to upshift based on at least one of the required torque, the transmission information (shift class, shift phase, current shift stage, target shift stage, etc.), or the transmission torque of the engine clutch. The reason for this is to determine the amount by which the torque transmitted to the input terminal of the transmission is less than the required torque (i.e. acceleration loss) during the torque phase at the time of upshifting.

Upon determining the acceleration loss due to mode switching or gear shifting, the acceleration loss calculator 243 may calculate power for compensating for the acceleration loss, i.e. an acceleration loss compensation amount. Because the acceleration loss compensation amount is a compensation amount that is discontinuously required for a relatively short time, for example, during mode switching or gear shifting, it may be referred to as "instantaneous torque".

The available auxiliary-drive-wheel output calculator 244 may calculate the available output of the second motor 170 based on the discharging limitation amount of the battery, the power consumption information on the first motor 140, and the temperature information on the second motor 170. The amount obtained by subtracting the amount of power consumed by the first motor 140 from the discharging limitation amount of the battery is equivalent to the amount of power that the second motor 170 can consume.

Next, the auxiliary-drive-wheel torque calculator 245 may determine the final torque that the second motor 170 is to output based on the power assist amount determined by the auxiliary-drive-wheel power assist calculator 242, the acceleration loss compensation amount for compensating for the acceleration loss determined by the acceleration loss calculator 243, and the available output of the second motor 170, determined by the available auxiliary-drive-wheel output calculator 244, and may transmit a torque command corresponding to the determined torque to the motor control unit 220.

For example, the auxiliary-drive-wheel torque calculator 245 may determine the sum of the power assist amount (i.e. continuous torque) and the acceleration compensation amount (i.e. instantaneous torque) to be the final torque of the second motor 170. When the sum of the power assist amount and the acceleration compensation amount exceeds the available output of the second motor 170, the final torque may be restricted to the available output.

Figure 5:
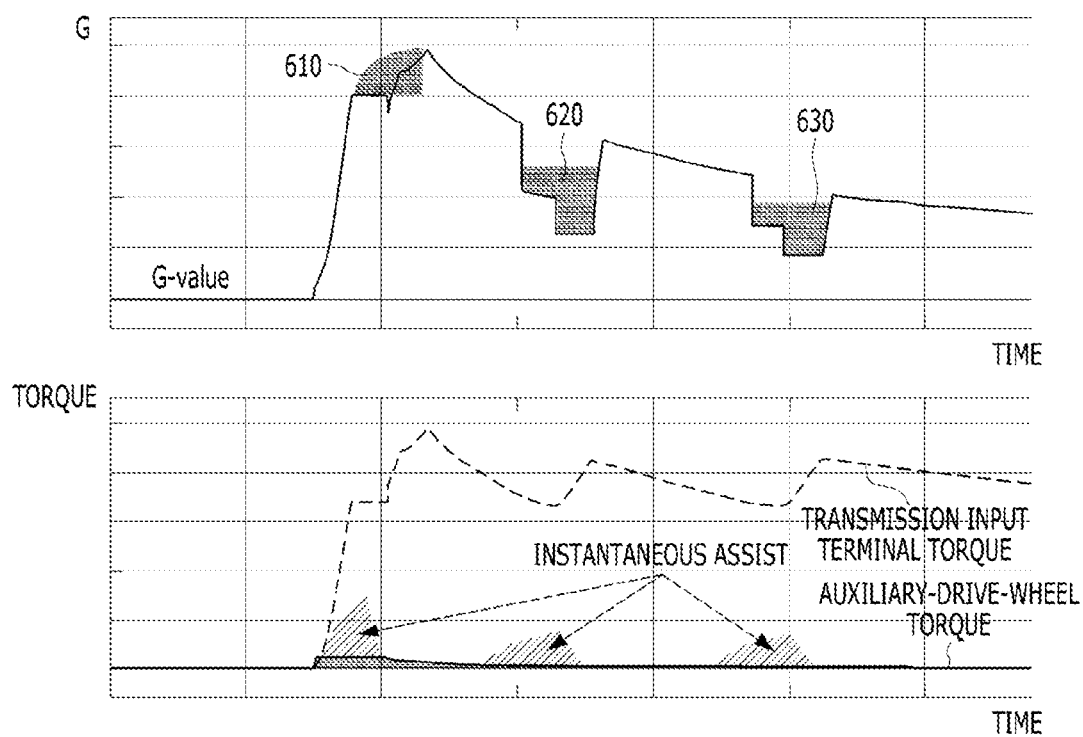
FIG. 5 shows an example of operation in which continuous torque and instantaneous torque of a second motor are applied according to an embodiment of the present invention.

FIG. 5 shows an example of operation in which the continuous torque and the instantaneous torque of the second motor are applied according to an embodiment of the present invention.

FIG. 5 includes an upper graph and a lower graph. The two graphs commonly have a horizontal axis representing time. The vertical axis of the upper graph represents acceleration, and the vertical axis of the lower graph represents torque.

Referring to FIG. 5, in a stopped state, when accelerator pedal depressing force exceeding a predetermined magnitude is input, acceleration increases sharply during the EV mode, and continuous torque is output from the auxiliary drive wheels. Further, transition from the EV mode to the HEV mode occurs due to high required torque, corresponding to a large accelerator pedal depressing force. At this time, the acceleration loss attributable to mode switching may be compensated for by the second motor 170 outputting instantaneous torque (assist) for compensating for the acceleration loss in addition to the continuous torque (610).

In addition, as the vehicle speed increases, upshifting from the first gear to the second gear and upshifting from the second gear to the third gear occur sequentially, and the second motor 170 outputs instantaneous torque (assist) at each upshift, thereby compensating for each acceleration loss (620 and 630).

Through the above-described torque control of the second motor 170, particularly, when the vehicle in a stopped state is accelerated by input of accelerator pedal depressing force exceeding a predetermined magnitude, it is possible to assist acceleration using the continuous torque and to minimize acceleration loss using the instantaneous torque. Accordingly, the electric all-wheel-drive hybrid electric vehicle may exhibit improved acceleration performance, and may convey an improved acceleration sensation.

Figure 6:
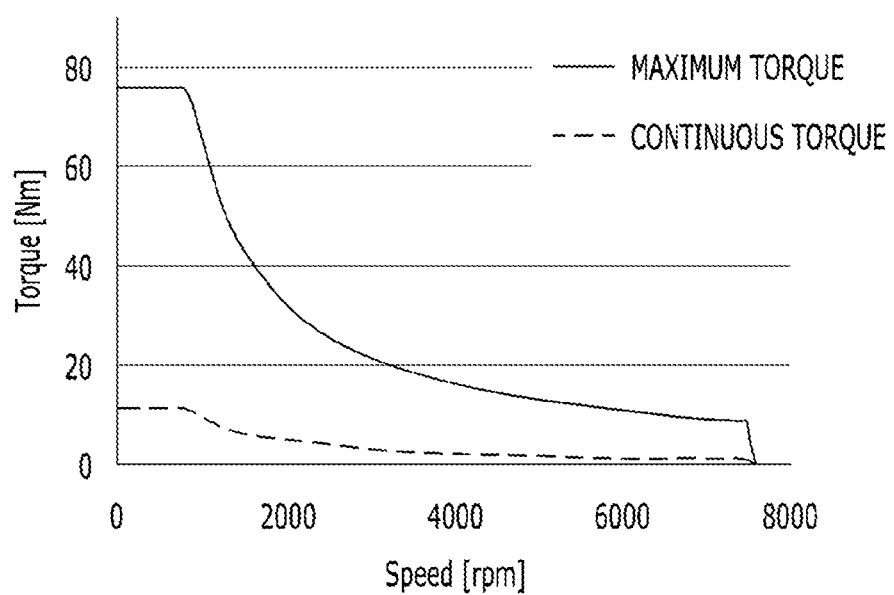
FIG. 6 shows an example of the relationship between available torque and continuous torque according to an embodiment of the present invention.

FIG. 6 shows an example of the relationship between available torque and continuous torque according to an embodiment of the present invention.

It is preferable that the temperature of the second motor 170 connected to the auxiliary drive wheels be maintained at a predetermined level or lower so as to immediately respond to a request for all-wheel drive, the occurrence time of which is not predictable. Therefore, as shown in FIG. 6, the maximum value of the continuous torque may be set in advance for each RPM so as to minimize an increase in the temperature according to the heat generation characteristics of the second motor 170. The auxiliary-drive-wheel power assist calculator 242 may determine continuous torque based on the torque obtained by subtracting the torque that can be output by the powertrain of the front wheels from the required torque and the maximum value of the continuous torque corresponding to the speed (RPM) of the second motor 170 according to the vehicle speed.

That is, if the torque obtained by subtracting the torque that can be output by the powertrain of the front wheels from the required torque is less than or equal to the maximum available output of the second motor 170, the required torque may be completely satisfied by outputting continuous torque. However, when the second motor 170 continuously outputs high torque, it may be impossible to respond to a request for all-wheel drive. Therefore, the continuous torque output value of the second motor 170 may be restricted so as not to exceed the maximum value set for a corresponding RPM, which is defined in the torque map shown in FIG. 6.

Figure 7:
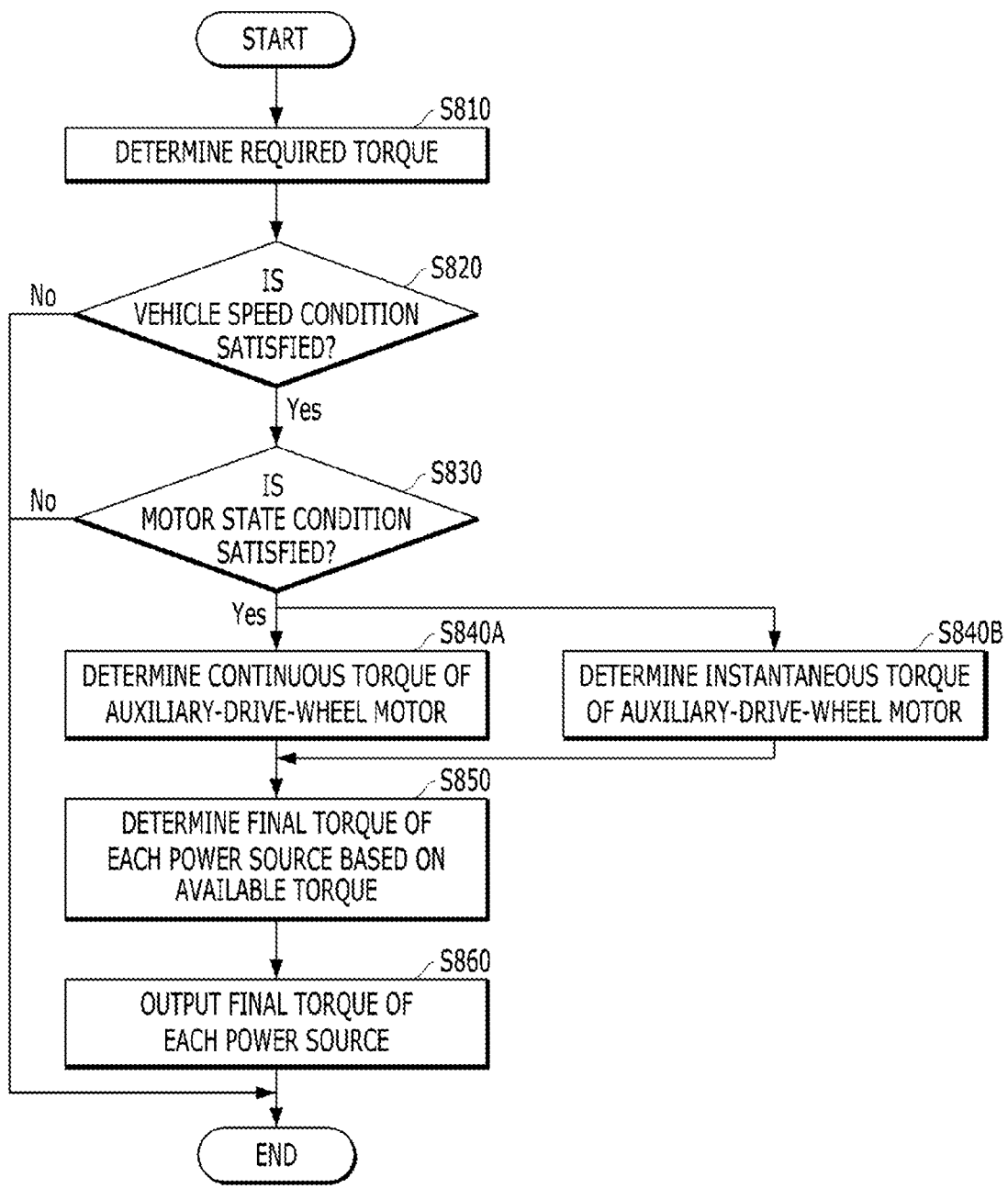
FIG. 7 is a flowchart showing an example of a method of controlling an electric all-wheel-drive hybrid electric vehicle according to an embodiment of the present invention.

FIG. 7 is a flowchart showing a method of controlling the electric all-wheel-drive hybrid electric vehicle described above.

Referring to FIG. 7, the required torque calculator 241 of the hybrid control unit 240 may determine the required torque (S810).

When both the vehicle speed condition and the motor state condition are satisfied (Yes in S820 and Yes in S830), the hybrid control unit 240 may perform a determination of continuous torque (S840A) and a determination of instantaneous torque (S840B) that the second motor connected to the auxiliary drive wheels is to output.

Here, the vehicle speed condition may be satisfied when the vehicle speed is within a predetermined range. The lower limit value of the predetermined range may be a vehicle speed at which it can be considered that the vehicle has started from a stopped state, and the upper limit value of the predetermined range may be a vehicle speed at which acceleration loss is less than or equal to a predetermined level at the time of upshifting. However, the embodiment is not limited thereto.

In addition, the motor state condition may be satisfied when the temperature of the second motor 170 is equal to or less than a predetermined temperature. Here, the predetermined temperature may be a temperature at which it is difficult to immediately respond to all-wheel-drive control, and may be set through experimentation according to the performance of the second motor 170 and the configuration of the vehicle. However, the embodiment is not limited thereto. If the motor state condition is not satisfied, the temperature of the second motor 170 needs to be lowered so that there is no problem in responding to a request for all-wheel drive, and thus the continuous torque and the instantaneous torque according to the embodiment are not output.

As described above, the determination of continuous torque (S840A) may be performed based on the torque required by the auxiliary-drive-wheel power assist calculator 242, the torque that the powertrain of the front wheels can output, and the maximum value of the continuous torque corresponding to the speed (RPM) of the second motor 170 according to the vehicle speed.

In addition, the determination of instantaneous torque (S840B) may be performed in a manner such that the acceleration loss calculator 243 calculates instantaneous torque for compensating for acceleration loss at the time of mode switching or upshifting. The concrete determination method is the same as that described above with reference to FIG. 4, and thus a duplicate description thereof will be omitted.

When the determination of continuous torque and the determination of instantaneous torque are completed, the hybrid control unit 240 may determine the final output torque of each power source (S850), and may transmit torque commands to the control units for controlling the individual power sources so that the power sources output respective final torque (S860).

For example, when the sum of the continuous torque and the instantaneous torque does not exceed the maximum available output of the second motor 170 determined by the available auxiliary-drive-wheel output calculator 244, the auxiliary-drive-wheel torque calculator 245 may determine the corresponding sum to be the final torque of the second motor 170. On the other hand, when the sum of the continuous torque and the instantaneous torque is greater than the maximum available output of the second motor 170, the auxiliary-drive-wheel torque calculator 245 may restrict the final torque of the second motor 170 to the maximum available output.

The electric all-wheel-drive hybrid electric vehicle according to the embodiments described above has the following advantages.

First, it is possible to obtain an improved acceleration sensation, linearity, and gear-shifting sensation at the time of launch through control of the motor connected to the auxiliary drive wheels.

In particular, a secondary launch effect, which occurs at the main drive wheels, to which the parallel-type hybrid powertrain is connected, at the time of mode switching, may be improved through instantaneous torque of the auxiliary drive wheels.

In addition, when upshifting is performed in the situation in which high torque is required, acceleration loss may be compensated for through instantaneous torque of the auxiliary drive wheels.

Embodiments of the present invention may be implemented as code that can be written on a computer-readable recording medium and thus read by a computer system. The computer-readable recording medium includes all kinds of recording devices in which data that may be read by a computer system are stored. Examples of the computer-readable recording medium include a Hard Disk Drive (HDD), a Solid-State Disk (SSD), a Silicon Disk Drive (SDD), Read-Only Memory (ROM), Random Access Memory (RAM), Compact Disk ROM (CD-ROM), a magnetic tape, a floppy disc, and an optical data storage.

As is apparent from the above description, according to a hybrid electric vehicle associated with at least one embodiment of the present invention configured as described above, a motor connected to auxiliary drive wheels selectively outputs instantaneous torque in addition to continuous torque depending on the situation, thereby improving launch and acceleration performance.

However, the effects achievable through embodiments of the present invention are not limited to the above-mentioned effects, and other effects not mentioned herein will be clearly understood by those skilled in the art from the above description.

It will be apparent to those skilled in the art that various changes in form and details may be made without departing from the spirit and essential characteristics of the invention set forth herein. Accordingly, the above detailed description is not intended to be construed to limit the invention in all aspects and is to be considered by way of example. The scope of the invention should be determined by reasonable interpretation of the appended claims and all equivalent modifications made without departing from the invention should be included in the following claims.

What is claimed is:

1. A method of controlling a hybrid electric vehicle comprising an engine and a first motor connected to main drive wheels through a transmission and a second motor connected to auxiliary drive wheels, the method comprising:
   determining a required torque;
   in response to a predetermined condition being satisfied, determining a first torque that the second motor is to continuously output based on the required torque and a vehicle speed;
   in response to the predetermined condition being satisfied, determining a second torque that the second motor is to discontinuously output in order to compensate for acceleration loss in a situation in which the acceleration loss occurs due to a lack of an input torque to the transmission by the first motor or the engine based on a state of an engine clutch disposed between the engine and the first motor, a state of the transmission, or the required torque; and
   determining a final torque of the second motor based on the first torque and the second torque.

2. A method of controlling a hybrid electric vehicle comprising an engine and a first motor connected to main drive wheels through a transmission and a second motor connected to auxiliary drive wheels, the method comprising:
   determining a required torque;
   in response to a predetermined condition being satisfied, determining a first torque that the second motor is to continuously output based on the required torque and a vehicle speed;

in response to the predetermined condition being satisfied, determining a second torque that the second motor is to discontinuously output in order to compensate for acceleration loss in a situation in which the acceleration loss occurs due to a lack of an input torque to the transmission by the first motor or the engine based on a state of an engine clutch disposed between the engine and the first motor, a state of the transmission, or the required torque;

determining an available output of the second motor; and determining a final torque of the second motor based on the first torque and the second torque, wherein determining the final torque is performed such that a sum of the first torque and the second torque does not exceed the available output.

3. The method according to claim 2, wherein determining the available output is performed based on a discharging limitation amount of a battery, an amount of power consumed by the first motor, and a temperature of the second motor.

4. The method according to claim 1, wherein the situation in which the acceleration loss occurs comprises a situation of mode transition from a first driving mode using the first motor to a second driving mode using the engine or an upshift situation.

5. The method according to claim 4, wherein determining the second torque comprises determining the second torque in the situation of mode transition based on the required torque, the state of the engine clutch, and a discharging limitation amount of a battery.

6. The method according to claim 4, wherein determining the second torque comprises determining the second torque in the upshift situation based on the required torque, the state of the transmission, and transmission torque information on the engine clutch.

7. The method according to claim 1, wherein determining the first torque is performed based on a torque map set in consideration of an amount of heat generated by the second motor at each speed of the second motor.

8. The method according to claim 1, wherein the predetermined condition comprises a vehicle speed condition and a motor state condition.

9. The method according to claim 8, wherein:
the vehicle speed condition is satisfied when the vehicle speed is within a range corresponding to acceleration start; and
the motor state condition is satisfied when a temperature of the second motor is within a predetermined temperature range.

10. A non-transitory computer-readable recoding medium storing a program configured to execute the method of controlling the hybrid electric vehicle according to claim 1.

11. A hybrid electric vehicle comprising:
a transmission;
an engine connected to main drive wheels through the transmission;
a first motor connected to the main drive wheels through the transmission;
a second motor connected to auxiliary drive wheels;
in response to a predetermined condition being satisfied, a first controller configured to:
determine a first torque that the second motor is to continuously output based on a required torque and a vehicle speed;
determine a second torque that the second motor is to discontinuously output in order to compensate for acceleration loss in a situation in which the acceleration loss occurs due to a lack of a input torque to the transmission by the first motor or the engine based on a state of an engine clutch disposed between the engine and the first motor, a state of the transmission, or the required torque; and
determine a final torque of the second motor based on the first torque and the second torque; and
a second controller configured to control the second motor to output the final torque.

12. The hybrid electric vehicle according to claim 11, wherein the first controller is configured to determine an available output of the second motor and to determine the final torque such that a sum of the first torque and the second torque does not exceed the available output.

13. The hybrid electric vehicle according to claim 12, wherein the first controller is configured to determine the available output based on a discharging limitation amount of a battery, an amount of power consumed by the first motor, and a temperature of the second motor.

14. The hybrid electric vehicle according to claim 11, wherein the situation in which the acceleration loss occurs comprises a situation of mode transition from a first driving mode using the first motor to a second driving mode using the engine or an upshift situation.

15. The hybrid electric vehicle according to claim 14, wherein the first controller is configured to determine the second torque in the situation of mode transition based on the required torque, the state of the engine clutch, and a discharging limitation amount of a battery.

16. The hybrid electric vehicle according to claim 14, wherein the first controller is configured to determine the second torque in the upshift situation based on the required torque, the state of the transmission, and transmission torque information on the engine clutch.

17. The hybrid electric vehicle according to claim 11, wherein the first controller is configured to determine the first torque based on a torque map set in consideration of an amount of heat generated by the second motor at each speed of the second motor.

18. The hybrid electric vehicle according to claim 11, wherein the predetermined condition comprises a vehicle speed condition and a motor state condition.

19. The hybrid electric vehicle according to claim 18, wherein the vehicle speed condition is satisfied when the vehicle speed is within a range corresponding to acceleration start.

20. The hybrid electric vehicle according to claim 19, wherein the motor state condition is satisfied when a temperature of the second motor is within a predetermined temperature range.

* * * * *